Nov. 30, 1954  F. A. LINDGREN ET AL  2,695,700
MINING CONVEYER
Filed Sept. 23, 1950  11 Sheets-Sheet 1
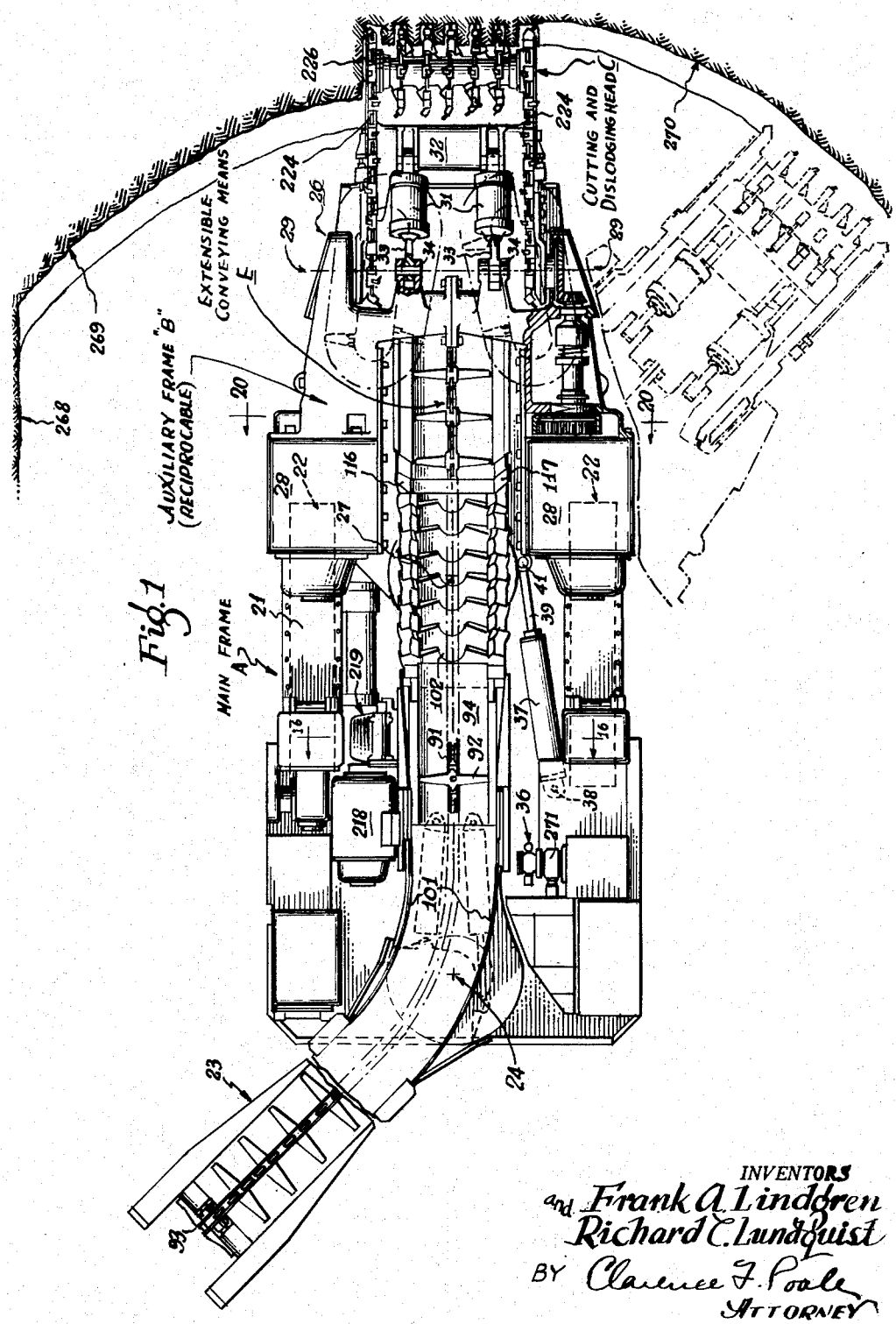
INVENTORS
Frank A. Lindgren
Richard C. Lundquist
BY Clarence F. Poole
ATTORNEY

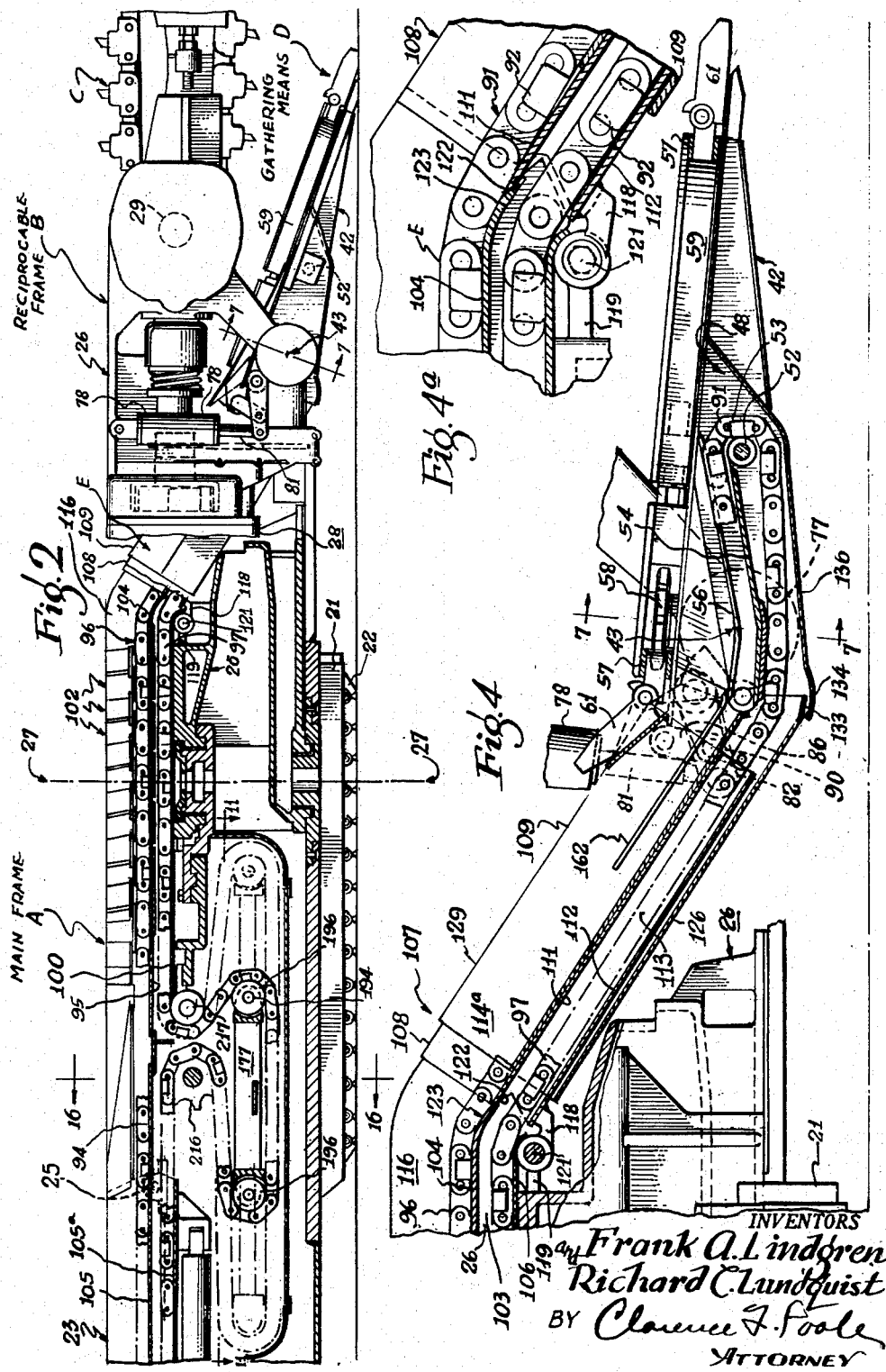

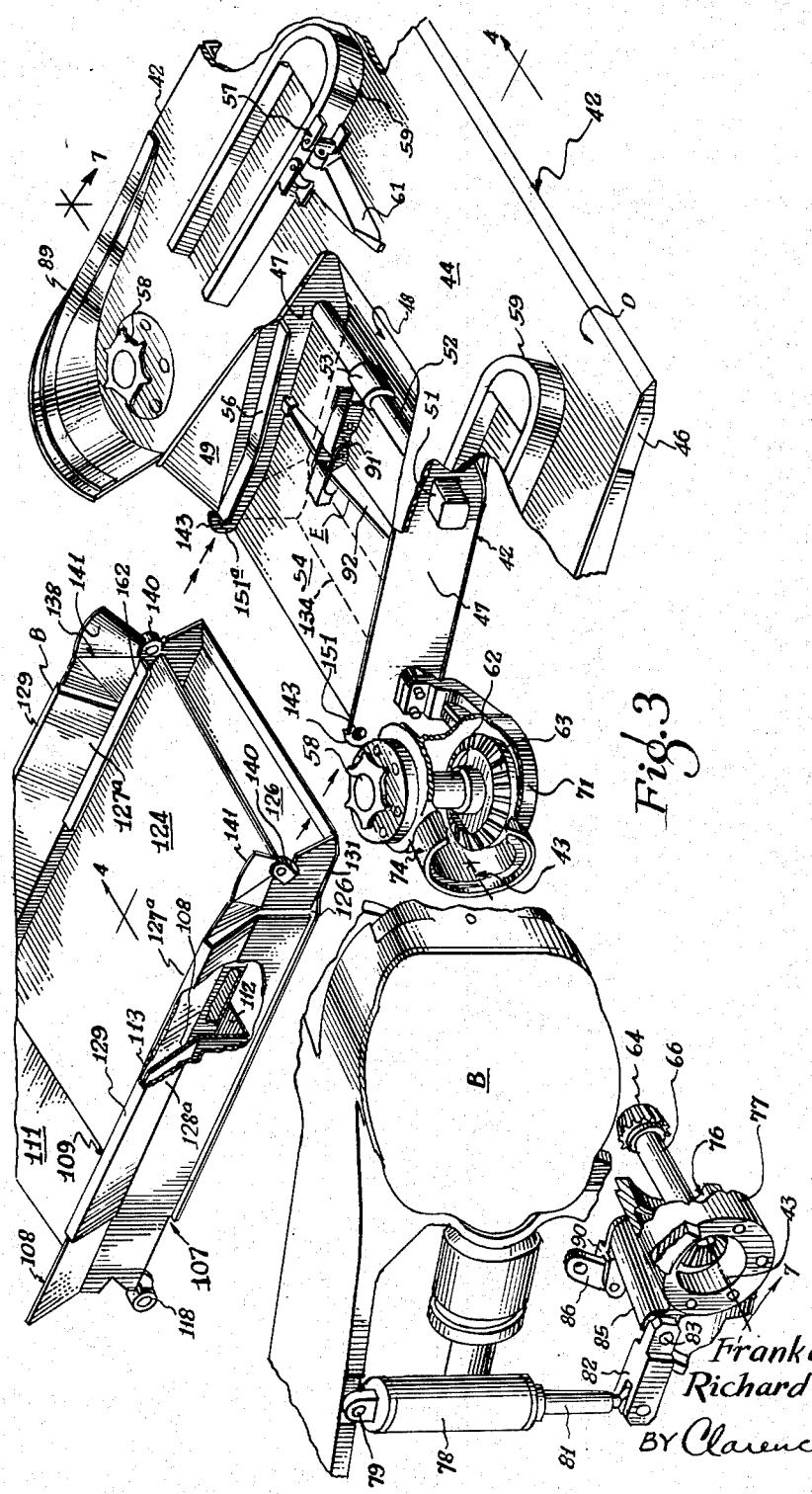

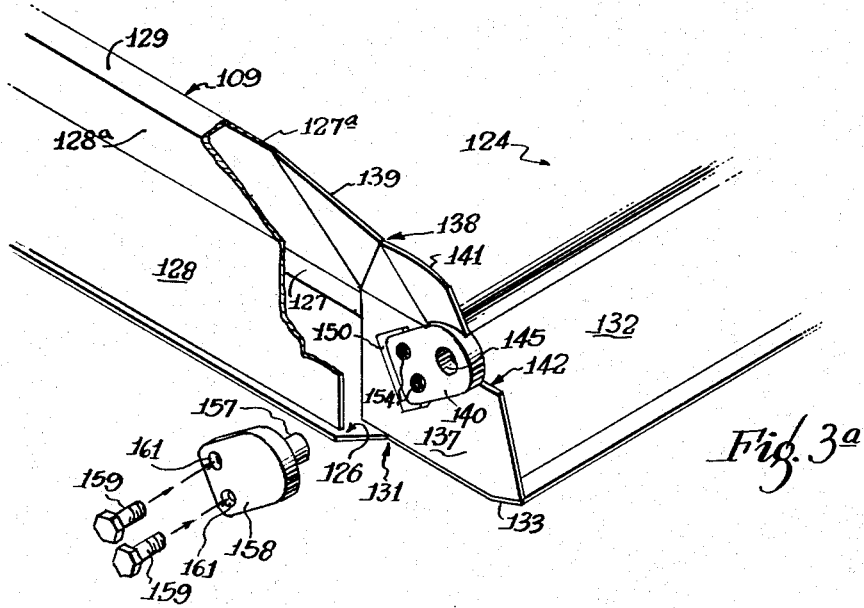
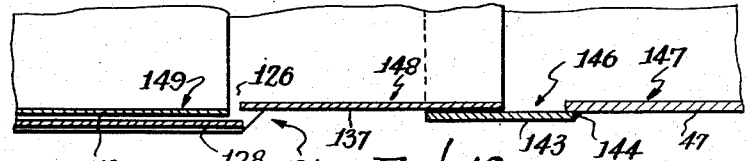
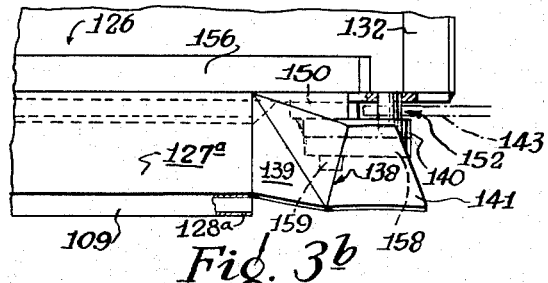

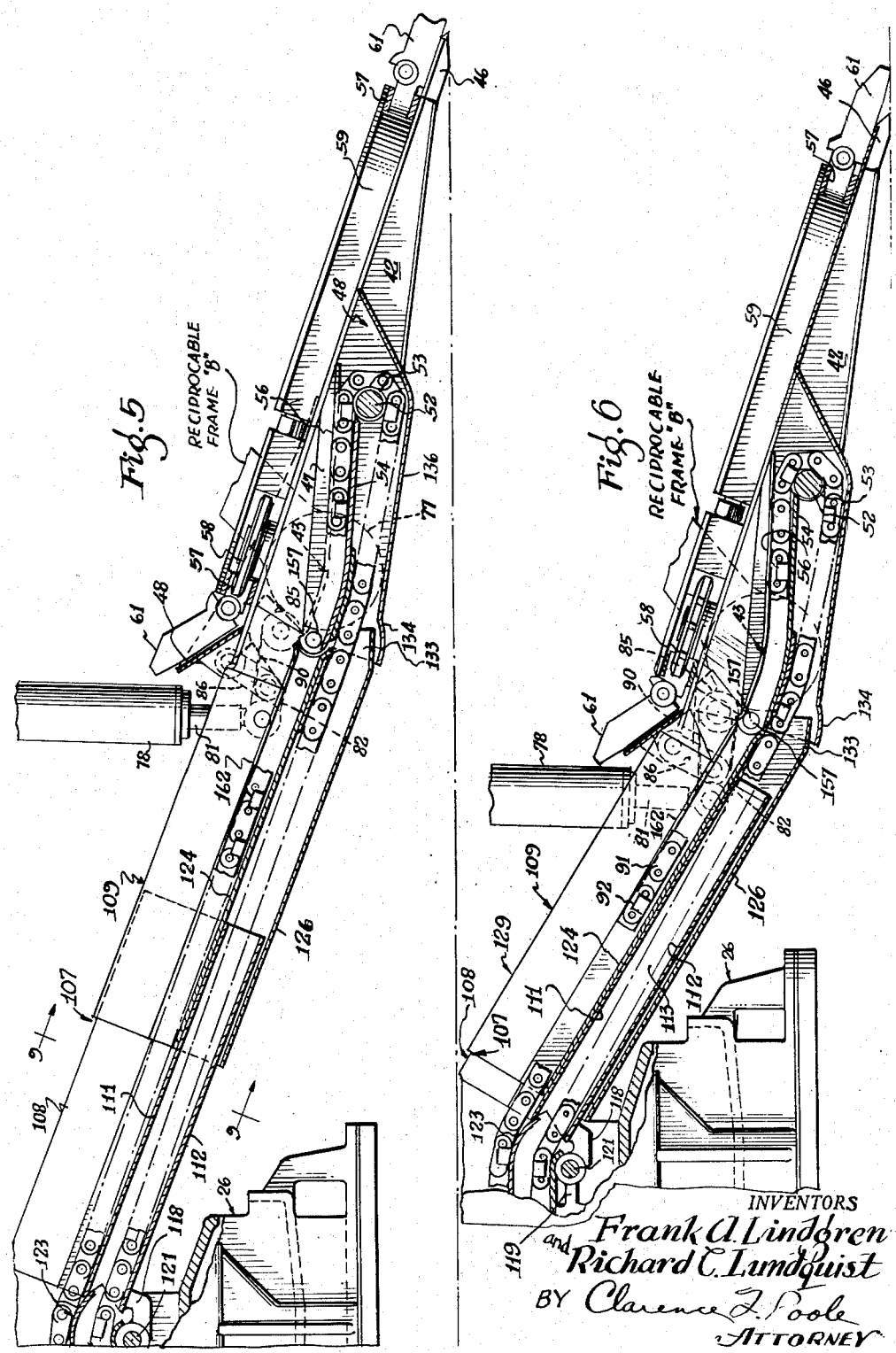

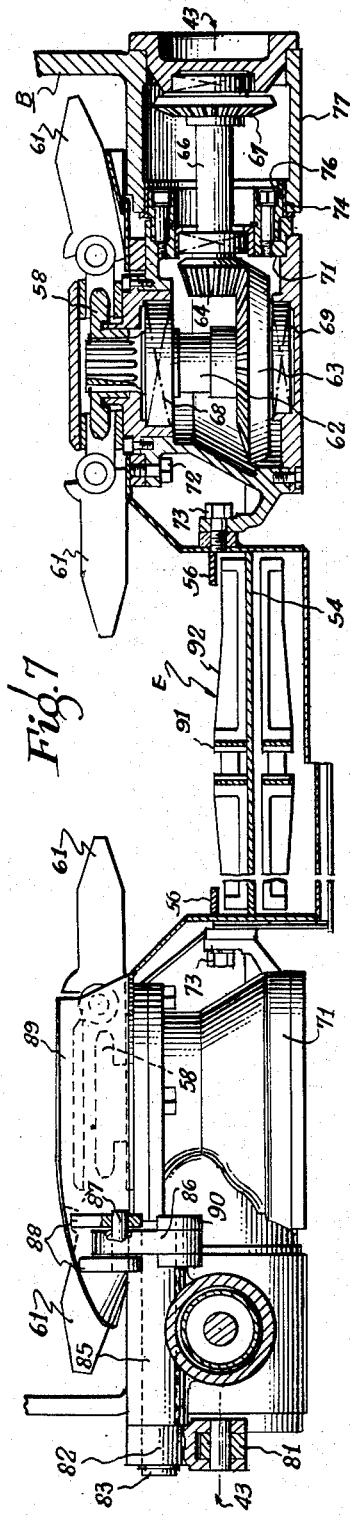
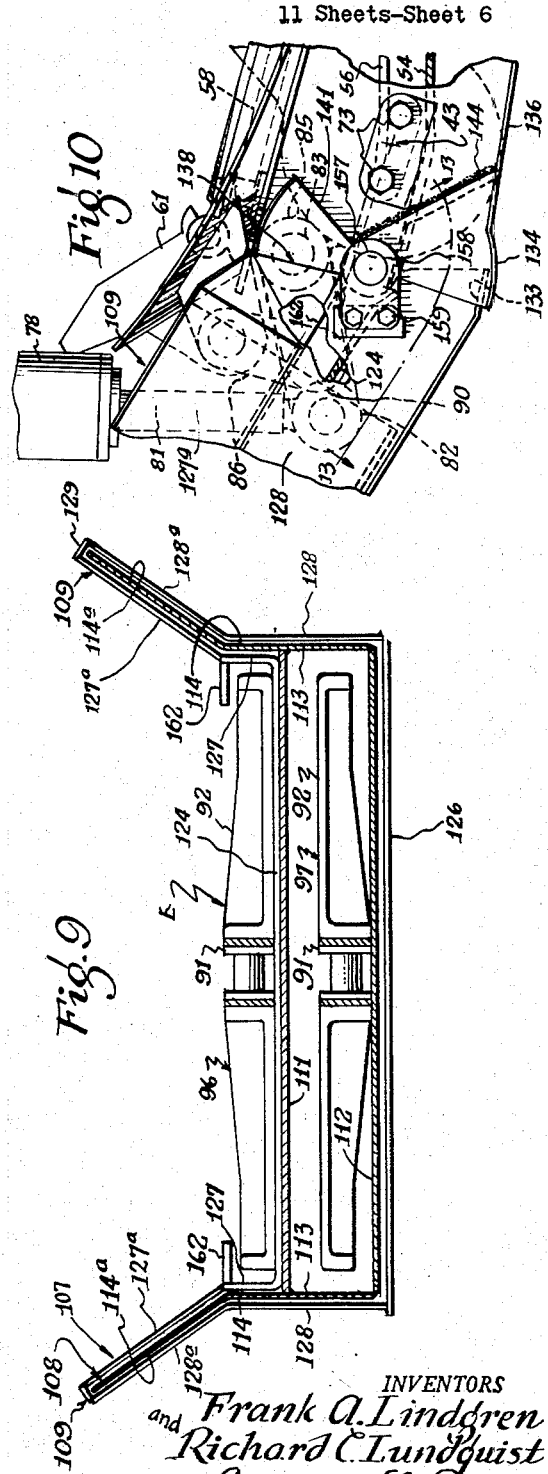

Nov. 30, 1954  F. A. LINDGREN ET AL  2,695,700
MINING CONVEYER
Filed Sept. 23, 1950  11 Sheets-Sheet 7
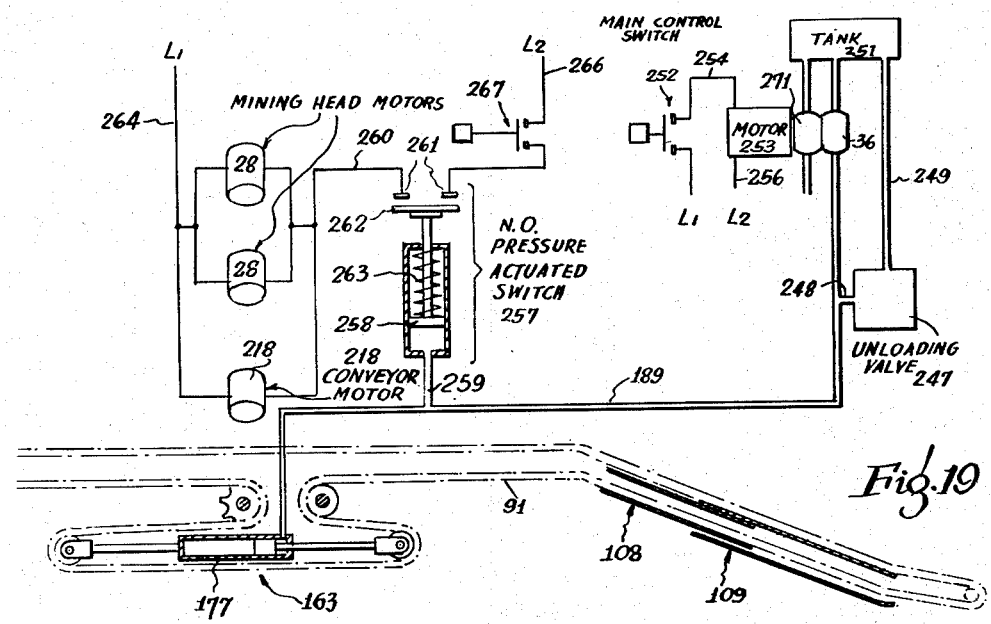
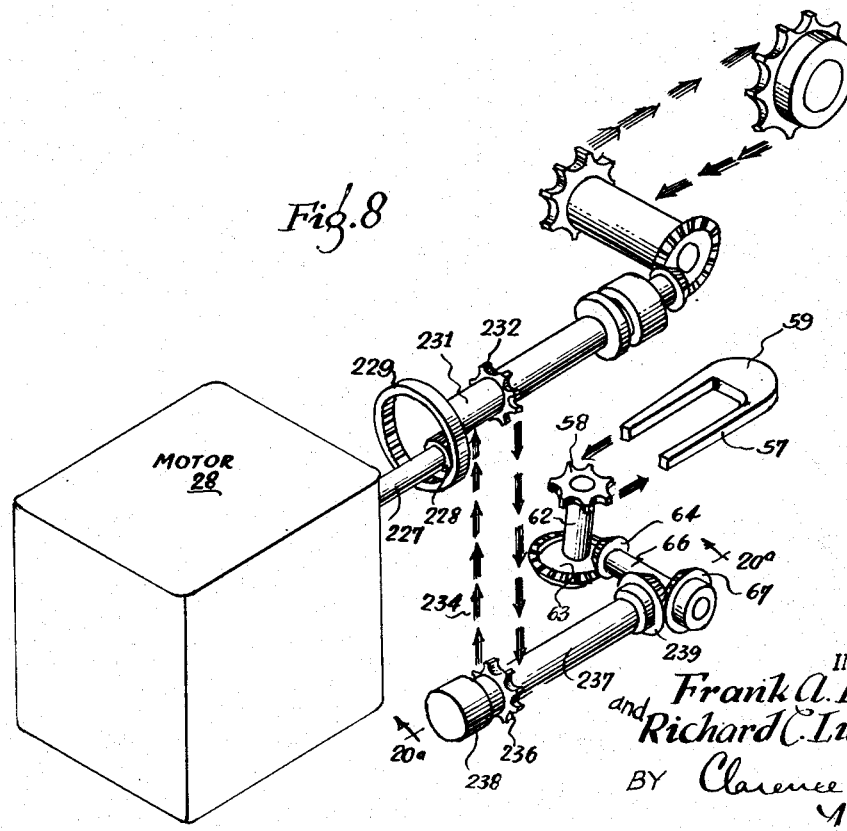

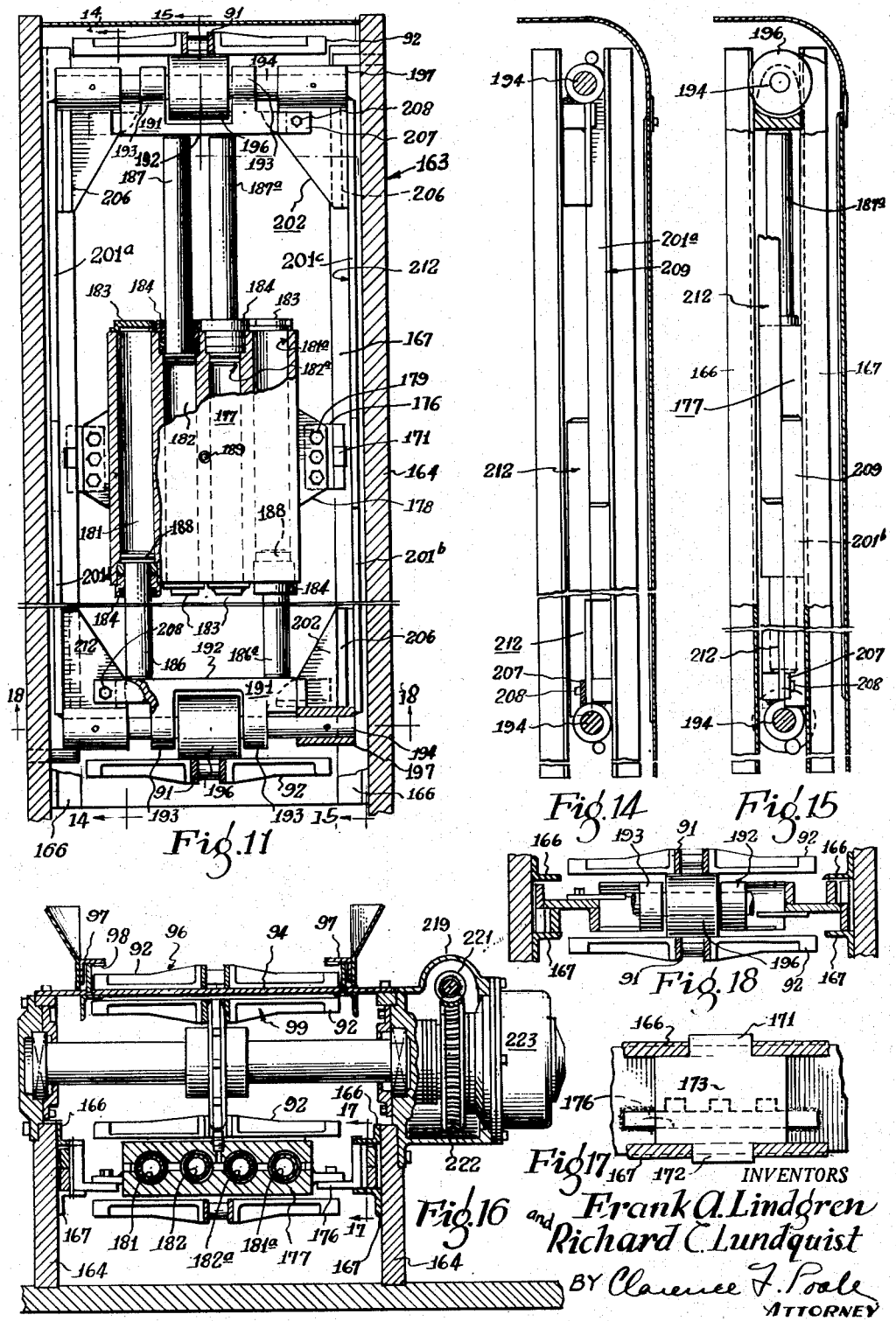

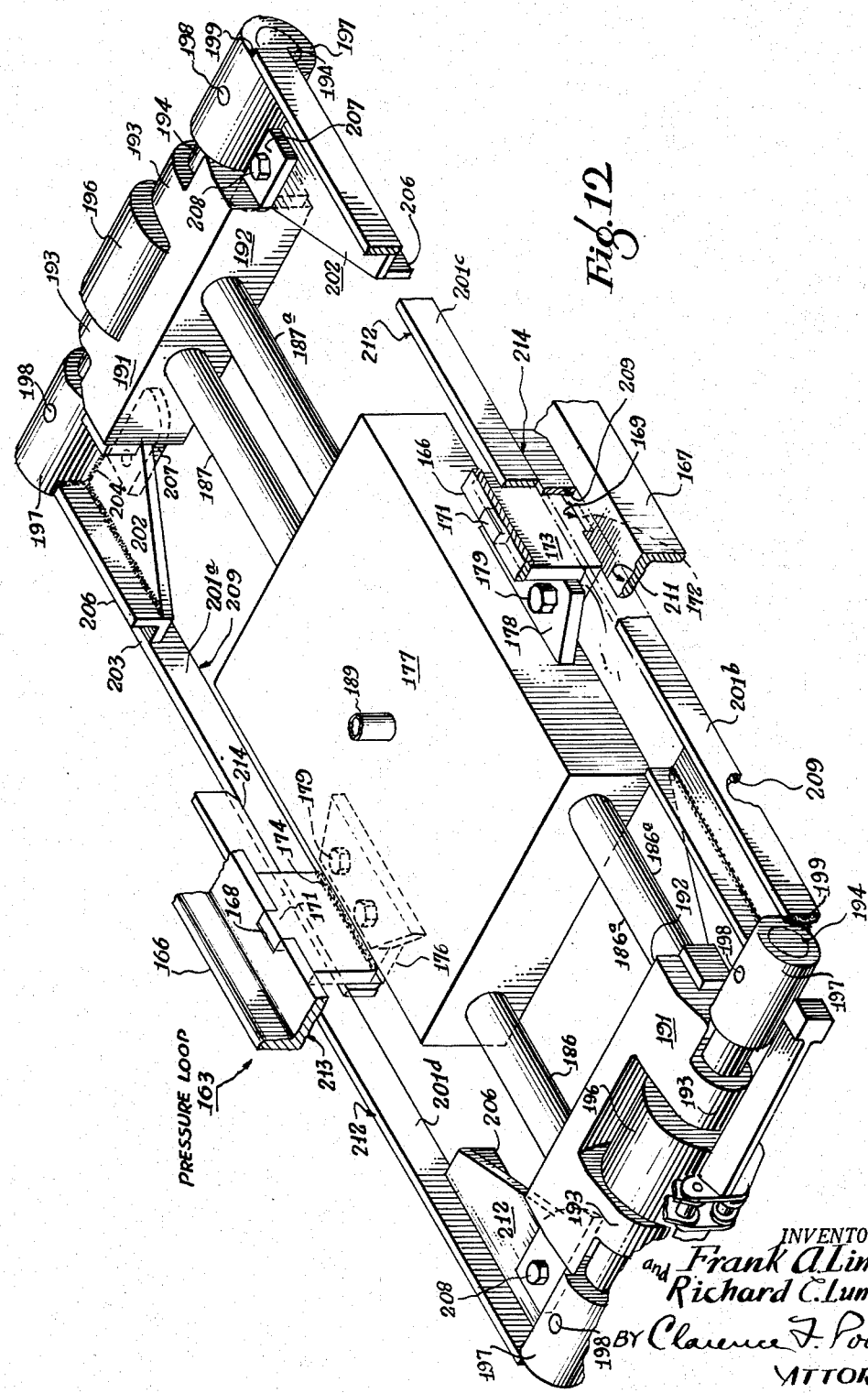

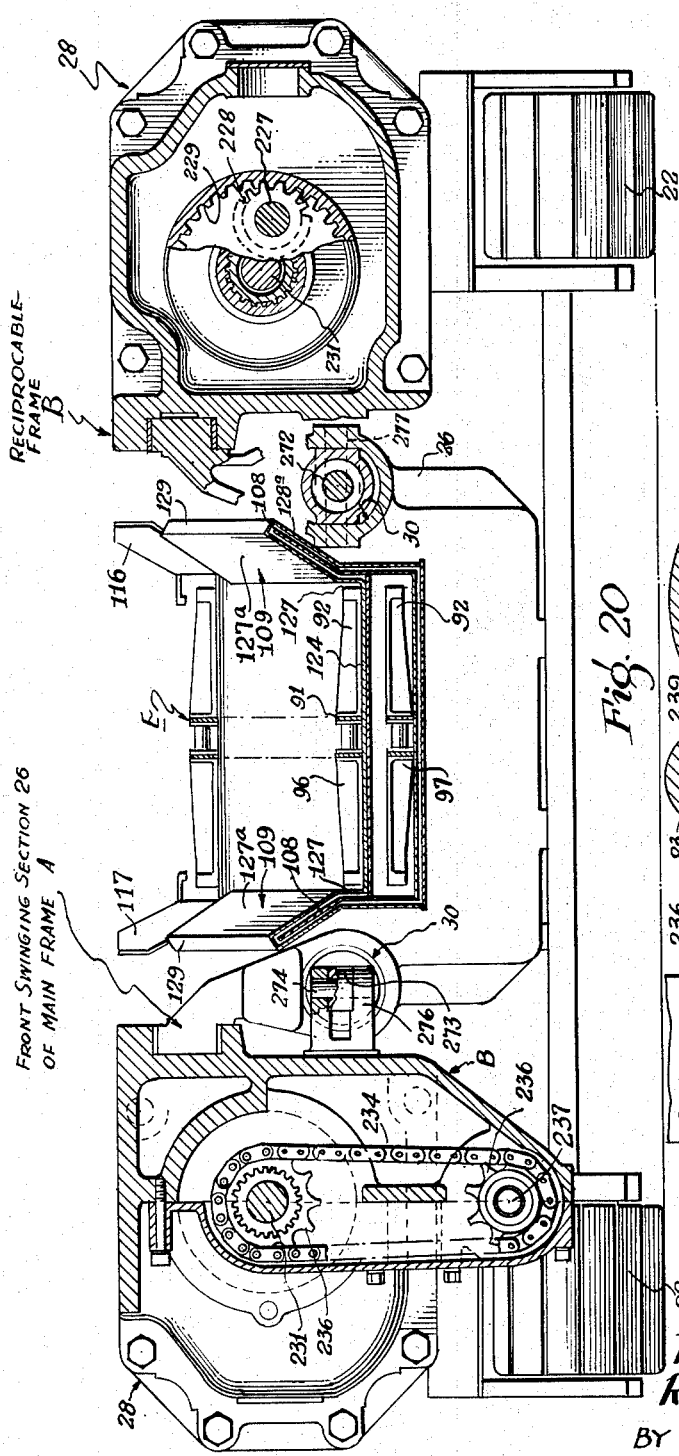
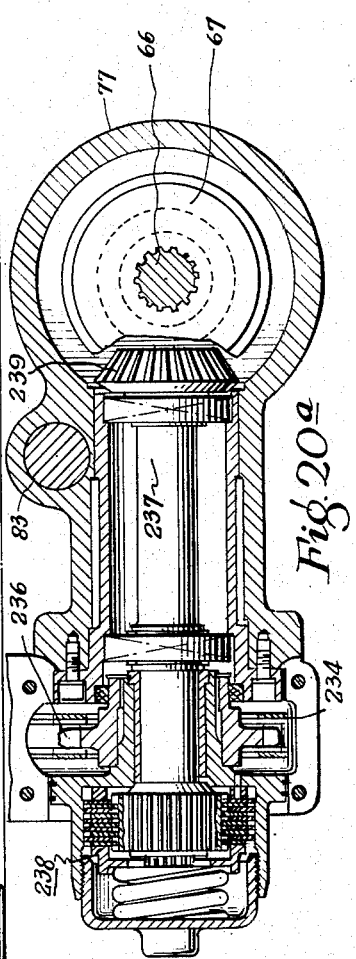

United States Patent Office 2,695,700
Patented Nov. 30, 1954

2,695,700

MINING CONVEYER

Frank August Lindgren and Richard C. Lundquist, Chicago, Ill., assignors to Goodman Manufacturing Company, Chicago, Ill., a corporation of Illinois Application September 23, 1950, Serial No. 186,326

9 Claims. (Cl. 198—139)

This invention relates to mining, and particularly to improvements in low-height loading machines and continuous mining machines for use in coal, salt and ore mines and the like.

One type of machine in which the present invention may be used to advantage is the continuous miner disclosed in the patent application of Frank Cartlidge, Serial No. 116,684, filed September 20, 1949. That machine has a cutter head which is operated first by sumping into the mine face followed by sumping downward to dislodge material from the mine face. The latter is transferred by gathering arms to an articulated conveyor which extends from a forward point adjacent the cutter head to the rear of the machine for discharging the material onto a receiver such as a shuttle car or belt conveyor.

During the above-mentioned sumping operation, the main frame of the machine remains stationary on its treads while a reciprocable auxiliary frame, which carries the cutter head is fed forward. During this forward feeding movement, it is important that the forward end of the conveyor and its associated gathering mechanism be maintained at a fixed distance from the cutter head for most efficient pick-up of the dislodged material.

Thus, the forward end of the conveyor must move back and forth with the cutter head. This would pose no problem in a high machine where the conveyor could be made in two sections including a non-reciprocable rear section, and a reciprocable front section, the sections being arranged in cascade relationship with the front discharging onto the rear through a hopper. Where the machine must operate with very low headroom, as for instance in a 30-inch seam, the two-section cascade arrangement is distinctly disadvantageous because of the height it requires. For a low-height machine, therefore, a single articulated conveyor is preferred.

A serious problem is posed in the use of a single articulated conveyor in that the rear end must remain fixed with respect to the shuttle car or other receiver while the front end must move back and forth with extension and retraction of the cutter head as above-explained. In other words, the conveyor itself must stretch, or extend, and must operate as a conveyor while being extended or retracted. Herein lies an important problem with which the present invention is concerned.

Accordingly, a principal object of the present invention is the provision of extensible conveying apparatus for material handling apparatus such as the continuous mining machine described in the above-mentioned co-pending application.

In one specific form the invention comprises a front and rear pair of direction-changing sprockets carried by an extensible frame. Carried by the sprockets is an endless conveyor chain which is trained over other movable sprockets in the form of an auxiliary loop. Within the loop, and tending to maintain it expanded, to thereby hold the chain taut against the front and rear sprockets, is a piston and cylinder arrangement to which is applied sufficient fluid pressure to maintain the chain at a predetermined tension. When the conveyor is elongated by extending the frame to spread the front and rear sprockets, the auxiliary loop will be contracted correspondingly. Ancillary features include a control arrangement for the motor driving the conveyor which permits the conveyor to be operated only when the chain is taut to prevent it being thrown off the sprockets.

Figure 1 is a plan view of a continuous mining machine embodying a preferred form of the present invention;

Fig. 2 is a fragmentary side view, partly in section, of the front end portion of the machine shown in Fig. 1;

Fig. 3 is an exploded, fragmentary, perspective view of certain front end portions of the machine;

Fig. 3a is a fragmentary enlarged view of Fig. 3;

Fig. 3b is a plan view of the part shown in Fig. 3a;

Fig. 4 is an enlarged, fragmentary, longitudinal sectional front end of the conveyor and gathering mechanism assembly, taken along line 4—4 of Fig. 3, and showing the gathering mechanism in its raised position, for tramming;

Fig. 4a is an enlarged view of a portion of Fig. 4;

Fig. 5 is a view similar to Fig. 4 but showing the conveyor in extended position and the gathering mechanism in its ground-contacting position;

Fig. 6 is a view similar to Fig. 5 but showing the conveyor in its retracted position;

Fig. 7 is a transverse cross section view of the gathering and conveying mechanism as seen along line 7—7 of Figs. 2, 3 and 4;

Fig. 8 is a diagrammatic view of one of the duplicate driving arrangements for the cutter head and gathering mechanism;

Fig. 9 is an enlarged cross sectional view of Fig. 5 taken along the line 9—9;

Fig. 10 is an enlarged fragmentary side elevation showing how the gathering apron is mounted to the front end portion of the telescopical conveyor supporting means;

Fig. 11 is a cross-sectional, plan view of Fig. 2, taken along the line 11—11 and showing the fluid-pressure-operated conveyor chain tightening means;

Fig. 12 is a perspective view of the arrangement shown in Fig. 11;

Fig. 13 is a sectional view of Fig. 10, taken along curved line 13—13 of Fig. 10;

Fig. 14 is a cross sectional view of Fig. 11 taken along the line 14—14;

Fig. 15 is a cross sectional view of Fig. 11 taken along the line 15—15;

Fig. 16 is a cross sectional view of Figs. 1 and 2, taken along the line 16—16;

Fig. 17 is an enlarged longitudinal sectional view of Fig. 16 taken along the line 17—17;

Fig. 18 is a transverse cross sectional view of Fig. 11 taken along the line 18—18;

Fig. 19 is a diagrammatic view of certain parts of the chain-tightening control mechanism;

Fig. 20 is a transverse sectional view taken along line 20—20 of Fig. 1;

Fig. 20a is a fragmentary longitudinal sectional view of Fig. 8, taken along line 20a—20a.

General construction

Figure 21:
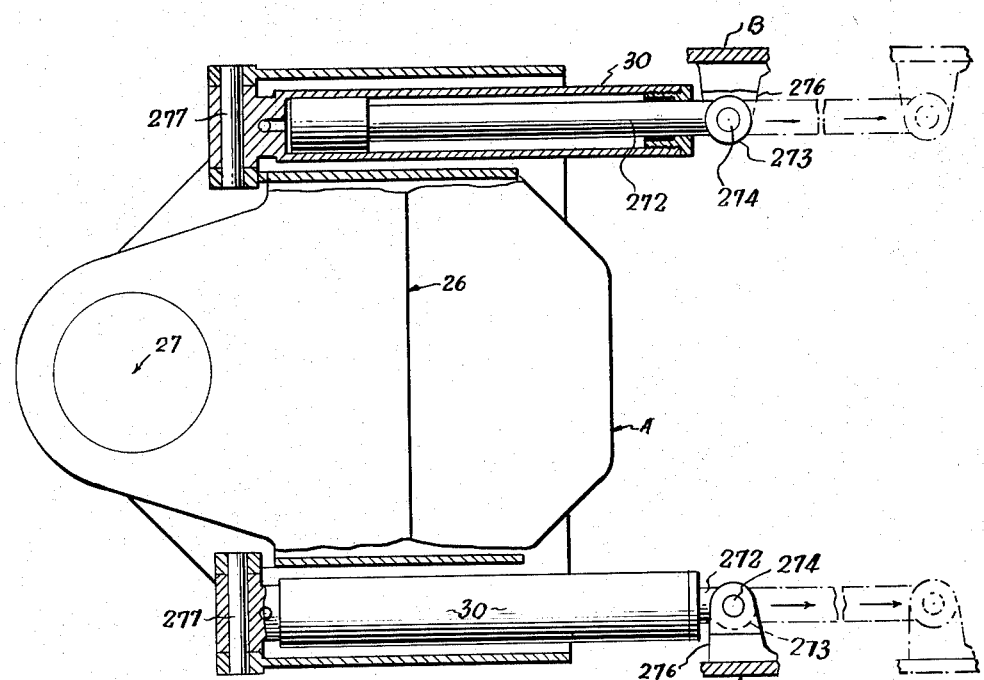
Fig. 21 is a fragmentary plan view of the machine showing the cylinder means utilized for extending and retracting the forward portion.

Referring now more specifically to the drawings and particularly to Figures 1 and 2, the continuous mining machine shown comprises a portable, endless-tread-mounted, main frame A having an auxiliary, reciprocable frame B mounted for forward and backward movement thereon. The reciprocable frame carries a cutting and dislodging head C which is pivotable from the ground level to the roof. The reciprocable frame carries gathering means D at the ground level which picks up mined material and transfers it to conveyor means E for discharge from the rear end of the machine.

The construction of the main frame A, auxiliary frame B, and cutting and dislodging head C are herein shown as being substantially identical to the construction of similar parts in the above-mentioned co-pending application, Serial No. 116,684, and hence they will not be described herein in detail.

In general, as shown in Figs. 1 and 2, the main frame A comprises: a center section 21 mounted on endless treads 22; a rear boom 23 pivotally mounted on the center section 21 for horizontal swinging movement about an axis 24 and for up and down tilting movement about another axis 25; and a front, swinging section 26 pivotally mounted on the center section 21 for horizontal swinging movement about an axis 27. The auxiliary frame B, above-mentioned, is carried on the front, swinging, section 26 of the main frame A and is mounted for forward and backward reciprocation thereon.

The auxiliary frame B carries a pair of main motors 28—28 for driving the head C and gathering means D. Suitable piston and cylinder means 30 (Fig. 21) is provided for moving the reciprocable frame B together with the motors 28, mining head C, gathering means D and associated parts forward and backward on the front swinging section 26 of the main frame A, all as taught in the above-mentioned co-pending application Serial No. 116,684.

Briefly, as shown in Figs. 20 and 21, the piston and cylinder means 30 has at its forward end a piston rod 272 having an apertured eyelet 273 which is attached by vertical pin 274 between ears 276 carried by the reciprocable frame B. At its rear, each of the cylinder means 30 is mounted on the swinging section 26 by means of a horizontal pin 277.

The mining head C is pivotable for up and down movement about a horizontal axis indicated at 29 in Figs. 1 and 2. A pair of double-acting cylinders 31 (Fig. 1), pivotally connected to a cross piece 32 on the cutter head C and having piston rods 33 pivotally connected to bifurcated extensions 34 of the reciprocable frame B, are suitably connected (by means not shown) to a hydraulic pressure generating pump 36 to raise and lower the mining head.

A double-acting cylinder 37 (Fig. 1), pivotally mounted at 38 to the main frame and having piston rod 39 pivotally mounted at 41 to an extension of the front swinging section 26, is effective to swing the latter and the reciprocable frame B and cutter head C and other parts carried thereby from right to left and from left to right when actuated by suitable hydraulic controls (not shown).

Gathering mechanism

The description will now be directed more particularly to the novel elements of the invention residing in the gathering means D and extensible conveying means E.

As best shown in Fig. 3, the gathering means D comprises a shell-like apron 42 fabricated largely from sheet metal and mounted for up and down pivotal movement about a horizontal axis 7—7 (indicated at 43) on the reciprocable frame B. The apron 42 comprises a generally U-shaped flat portion 44 terminating in a forward transverse strengthening plate 46. On the bottom side of the plate 44 are welded a pair of spaced, longitudinally extending, vertical plates 47 defining between them a material-receiving channel 48. A downwardly inclined, substantially triangular plate 49 welded between the inner edges of the legs of plate 44 and the vertical plates 47 function as upwardly extending, outwardly flared marginal portions of the channel 48 to facilitate feeding material into the latter. Between the plates 47, and rotatably mounted in bearing members 51, is a transverse shaft 52 carrying a forward, direction-changing roller 53 for the conveying means E to be described in greater detail. Behind the roller 53 the gathering apron has a transverse horizontal supporting plate 54 welded between the vertical plates 47 and having a contour as best shown in Figs. 4, 5 and 6. The plate 54 functions as a riding or supporting surface for the upper reach of the conveying means. An inwardly extending guide rail 56, spaced above the plate 54 on each side of the latter, functions as a hold-down for the conveying means, all as will be described in more detail subsequently.

The gathering mechanism D may be of any well known form but is herein shown as being an endless chain type including two laterally spaced endless chains 57, each guided in an orbital path about a driving sprocket 58 and a U-shaped shoe 59 about which are suitably secured upon the top surface of the apron plate 44 and along opposite sides of the receiving end of the conveying means E. These endless chains each have a plurality of spaced gathering arms 61 pivotally connected thereto and extending laterally therefrom and beyond the forward end of the apron 42 at their forward limit of travel to pick up loose material from the ground and discharge it into the channel 48 at the receiving end of the conveyor. Each of the sprockets 58 comprises driving means for its respective gathering chain and, as best shown in Figs. 3, 7 and 8, each is mounted on a vertical shaft 62 carrying a beveled gear 63 and being driven by a pinion 64 which in turn is carried by a horizontal shaft 66 on beveled gear 67. Each vertical shaft 62 is suitably journaled in bearings 68 and 69 (Fig. 7) in a gear housing 71 which is mounted on the gathering apron by bolts 72 and 73.

Each of the gear housings 71 is provided with a horizontal, transversely extending, exterior bearing portion 74, concentric with the pivotal axis 43 on the gathering mechanism. Each of the bearing portions 74 functions as a trunnion for the gathering mechanism and is journaled for pivotal movement within a corresponding internal bearing or bore 76 (Figs. 3 and 7) formed within a gear housing 77 carried by the reciprocable frame B.

The gathering mechanism is pivotally movable up and down about its axis 43 by fluid-pressure-operated cylinder means including a cylinder 78 (Fig. 3) pivotally mounted at a point 79 on each side of the reciprocable frame B. Each cylinder 78 has a piston rod 81 which is movable up and down responsive to pressure generated by a pump 271, to be described. A horizontal, forwardly extending lever 82 is pivotally mounted at its rear end to the piston rod 81 and at the other end it is fastened as a lever to a shaft 83 trunnioned in a bearing 85 on frame B. Each shaft 83 extends inwardly and carries another lever 90. Each lever 90 is pivotally connected to a link 86 which, as best shown in Fig. 7, is pivotally mounted on a pin 87 carried between a pair of rearwardly extending ears 88 mounted on the backside of the upstanding rear arcuate guide portion 89 of the gathering apron. Thus, when fluid pressure is admitted from a suitable source to move the piston rods 81 downward, the levers 82 will be moved downwardly to rotate their corresponding shafts 83 and inner levers 90. They, in turn, will pull the rear end of the gathering apron downward, through links 86, to lift the front end of the gathering means to the position shown, for instance, in Fig. 5 where the gathering mechanism is clear of the floor, for tramming.

It will be apparent that, since the gathering means D and the cutter head C are both mounted on the reciprocable frame B, they will be moved back and forth with the latter, maintaining their relative longitudinal positions.

Conveying mechanism

The extensible conveying means, generally designated E, is herein shown as being of the laterally flexible, center strand, endless chain and flight conveyor type. It includes an endless chain 91 (Fig. 1) formed from a plurality of aligned links which are vertically and horizontally pivoted at their opposite ends to front and rear portions of material carrying, transverse flights 92. The endless chain 91 passes around the previously mentioned direction-changing idler 53. At its rear end, the conveyor chain 91 is trained about another direction-changing idler 93 (Fig. 1) on the rear boom 23.

It will be apparent that when the forward idler roller 53 is moved, by the reciprocable frame B, the distance spanned by the conveyor chain between the rollers 53 and 93 will change. Important aspects of the present invention are to change the effective length of the chain automatically as the distance between the idlers changes and, to maintain a predetermined tension in the chain at all effective lengths.

Attention will now be directed to the improved means for supporting and tensioning the conveyor chain.

The main frame A includes upper horizontal plates 94 and 95 (Figs. 2 and 16) along which the upper reach 96 of the conveyor chain 91 runs. Hold-down angles 97 (Figs 16), with inner wear plates 98, maintain the flights 92 in working proximity with the top surface of plate 94. The lower reach 99 of the conveyor chain runs along below the underside of plates 94 and 95, being supported by conventional means including plate 100. The upper and lower reaches of the conveyor chain are supported in like manner on upper and lower plates 105 and 105a on the rear boom 23.

The upper and lower reaches of the chain at the juncture between the rear boom and main frame A may be flexibly supported for turning displacement about vertical pivot 24 in any suitable manner, as for instance between side plates 101 (Fig. 1) in the manner taught in the above-mentioned co-pending patent application, Serial No. 116,684.

Forwardly of the conveyor-supporting plates 94 and 95 on the main frame A, the upper and lower reaches of the conveyor chain are flexibly supported for turning movement about pivot 27, in this case by a structure including series of inter-connected, overlapping vetrebrate plates 102 made in accordance with the teaching of Patent No. 2,208,269 granted July 16, 1940, to Frank Cartlidge.

Forwardly of the vertebrate elements the swinging section 26 is provided with vertical side plates 103 (Fig. 4) defining a trough for the conveyor chain and is provided with top and bottom horizontal plates 104 and 106 for supporting the upper and lower reaches 96 and 97 of the conveyor chain respectively.

Further forwardly, ahead of the plates 104 and 106, as covered by co-pending patent application, Serial No. 352,800, filed May 1, 1953, for Mining Apparatus, is a downwardly inclined, telescopical, conveyor-supporting frame, generally designated 107 which comprises two inter-engaging box sections 108 and 109. Section 108 is formed with upper and lower floor plates 111 and 112 connected at the sides by walls 113 (Figs. 4 and 9), the latter having upwardly and outwardly extending side wall portions 114—114a to match similarly flaring trough-like side walls 116 and 117 (Figs. 1 and 2) on the swinging and vertebrate sections 26 and 102, respectively. As shown in Figs. 3 and 4, the floor 112 is provided on each side, at the rear end, with an ear 118 having a transverse aperture therethrough. The swinging section 26 is provided with a pair of mating forward extensions 119 carrying transverse pivot pins 121 on which the aperture-carrying ears 118 of the box section 108 are pivotally mounted. In order to provide for up-and-down pivotal movement of section 108 while maintaining the engagement between the upper floor plates 111 and 104, the latter are formed with mating cylindrical surfaces 122 and 123 which are generated by striking arcs about the axis of pivot pins 121. This may best be seen by reference to the enlarged fragmentary view shown in Fig. 4a.

The transverse configuration of box section 109 is best shown in Fig. 9. It will be observed that it is formed with upper and lower floor plates 124 and 126 which overlie and underlie floor plates 111 and 112 respectively of the inner section 108. Each side of upper plate 124 is bounded by a vertical wall 127 terminating in an outwardly flared trough-like wall 127a which closely follows the shape of the corresponding walls 114 and 114a. Similarly, each of the floor plates 126 is bounded by upstanding and outwardly flared side walls 128 and 128a which are shaped like corresponding side walls 114 and 114a respectively. Each corresponding pair of wall sections 127a—128a is joined at the top by a bridging section 129.

Thus, as shown in Fig. 9, the cross sections of parts 108 and 109 are such that the former fits telescopically inside the latter for movement between an elongated condition as shown in Fig. 5 and a retracted condition as shown in Fig. 6.

At its forward end, as shown in Fig. 3a, the floor plate 126 is narrowed somewhat by a cutout 131 on each side. The resulting, slightly narrowed forward portion 132 of the floor plate 126 is formed with an upwardly inclined lip 133 adapted to overlie and follow the rearwardly extending arcuate lip 134 of floor plate 136 in the gathering apron 42 (see Figs. 5 and 10). Upstanding along each side of the narrowed floor plate portion 132 and welded thereto is a vertical side section 137, the rear part of which abuts an upper, forward part of wall section 127, as shown in Fig. 3a. An upwardly and outwardly inclined flare 138, comprising segments 139 and 141, and shaped along its upper periphery like a flattened Z, is mounted along each forward end of the telescopic section 109 as follows: As shown in Fig. 3a, the segment 139 is butt-welded to the end of wall 127a and butt-welded to the top edge of vertical section 137, segment 141 being butt-welded to the forward edge of segment 139. As will be pointed out in detail subsequently, the flares 138 function as outerlaps for the upper spaces which otherwise would exist between the telescopical section 109 and the apron 42, thereby preventing spillage of material being carried by the conveyor chain at all conditions of up and down articulation.

As shown in Fig. 3a, on each side of the telescopical section 109, the upper edge of plate 137 and the adjacent lower edge of segment 141 is formed to define a forwardly extending curved slot 142 into which is fitted a forwardly-extending lug 140 having an aperture 145. The lug 140 is mounted as by welding to a reinforcing boss 150 which itself is welded to plate 137. As will be seen, the lugs 140 cooperate with ears 143 at the rear of the gathering apron to hinge the apron to the box section 109. Each ear 143 is mounted by means of a lap-weld along a line 144 (see Figs. 10 and 13). This offsets each ear member 143 outwardly relative to the corresponding apron side wall 47 and conveniently provides a recess 146 within which the corresponding side wall 137 may operate. Further, this arrangement provides for the inner surfaces 147, 148 and 149 (Fig. 13) of side plates 47, 137 and 113, respectively, to be substantially in alignment whereby, in turn, to provide substantially uniform trough width for the conveyor chain. As shown in Fig. 3, the ear member 143 and the adjacent portion of the apron side wall 47 are formed with circular openings 151 and 151a respectively.

Along each outer side of vertical wall 137 (see Fig. 3a) the boss 150 serves to space outward, a convenient distance, the lug 140 which is attached to it. This leaves a space 152 (Fig. 3b) at each side for reception of the corresponding ear 143 of the gathering apron. Each lug is provided with a pair of drilled and tapped holes 154 and the transverse bore 145 approximates the diameter of openings 151—151a in ears 143. To assemble the apron 42 into hinged relationship with the telescopical section 109, the parts are brought together to the position as shown in Figs. 3b and 10, with the lug 140 overlapping the ear member 143 on each side, and with lug openings 145 and ear openings 151—151a in alignment. The parts are then fastened together by inserting a pin 157 (Fig. 3a) through each corresponding set of openings 145—151—151a. Each pin 157 is then held in place by a locking plate 158 to which it is attached, the locking plate being retained by cap screws 159 extending through its holes 161 and being threadably engaged with the tapped holes 154 in lug 140.

The pivot pins 157 are located on a center, as shown in Fig. 10, which lies in the plane of the upper flight which runs between the floor plates 54—124 and guide rails 56—162 which are in the apron 42 and telescopic section 109, respectively.

*Cooperative relationship between gathering and conveying arrangements*

Figs. 5 and 6 illustrate the action of the telescopical sections and the pivotal joints just described. As previously stated, the reciprocable frame B carries the gathering apron 42 for forward and backward movement, the gathering apron being pivotal about the transverse axis indicated (in Fig. 3) at 43 in the center of gear housing 77. When the reciprocable frame B is extended, forwardly, the telescopical assembly 107 will be extended. This will cause section 108 to pivot upwardly about pin 121. At the same time, the telescopical section 109 will be pulled forwardly by the apron 42 by means of force exerted through the hinge pins 157. Likewise, as the apron is drawn forward, the telescopic section 109 will be rotated counter-clockwise (Fig. 6) about the hinge pins 157 while the angle between the conveyor supporting plates in the apron and in section 109 becomes flatter, as they approach the fully extended condition shown in Fig. 5.

It will be apparent that, as the reciprocable frame B moves the gathering apron 42 forward and backward, the latter is free to follow, flexibly, any irregularities in the floor by reason of the flexible structure just described. For instance, as the ground-contacting shoe 46 enters a depression, the apron 42 simply rotates clockwise about axis 43 a suitable amount accompanied by compensating pivotal movements about pins 121 and 157 and compensating telescopic adjustment between the individual conveyor supporting sections 108 and 109.

*Conveyor chain tensioning and storing means*

Referring now to the fluid-pressure actuated chain tightening means, generally designated 163 in Fig. 12, which comprises one of the important features of the present invention, it is supported by the vertical side members 164 (Fig. 16) of the main frame. Attached, as by welding to the inner surface of each side member 164, are upper and lower horizontally extending angles 166 and 167, respectively. The angles are provided with notches 168 and 169, respectively, within which upper and lower ears 171 and 172 of vertical plate sections 173 are interlockably engaged. At the bottom of each plate section and as attached by means of welding along the line 174 is a short horizontal plate section 176. A cylinder block 177 is provided with transverse lugs 178 which rest atop the horizontal plate sections 176 and are fixed thereto by means of bolts 179. Thus, it will be seen that the cylinder block 177 is restricted against both longitudinal and transverse displacements relative to the frame through the interengagement of ears 171 and 172 within recesses 168 and 169. At the same time this arrangement permits the cylinder block 177 to be removed readily simply by unfastening bolts 179.

As best shown in Fig. 11, the cylinder block 177 is formed with four cylinder bores 181, 181a, 182 and 182a; 181 and 181a may, for convenience, be referred to as outer cylinders and 182 and 182a as inner cylinders. Each cylinder is provided at its head end with suitable cap or closure means 183. Opposite the closure means in each case is a suitable packing arrangement 184 for providing a fluid tight seal about a corresponding one of the piston rods 186, 186a, 187 and 187a. Within each bore, a piston 188 is connected to the inner end of the corresponding piston rod.

The interior of the cylinder block 177 is suitably provided with ports and passages (not shown) which concurrently connect the head ends of all cylinder bores with an exterior pressure conduit 189. By this arrangement, when fluid under pressure is directed into the conduit 189 it can be effective to extend all four piston rods.

Each end of the tensioning means 163 is provided with a longitudinally reciprocable pressure block 191 having a flat inner surface 192 against which the corresponding pair of piston rods abut. Each block 191 has a pair of ears 193 through which a transverse cross shaft 194 is mounted. Between each pair of ears 193, an idler roller 196 is retained for rotation about the shaft 194. In practice, suitable journal bearings would be employed but are not shown here in order to simplify the disclosure. To prevent the pressure blocks 191 from cocking when force is applied to them by the piston rods, they are guided by the following arrangement:

Referring to Fig. 12, each end of each cross shaft 194 carries a cylindrical bushing 197 fixed thereto by a pin 198. Mounted on the outer end of each bushing 197, as by welding at 199, is one of the longitudinally extending guide strips 201a, 201b, 201c and 201d. A gusset 202 is attached, as by welding, along lines 203 and 204 to each corresponding pair of the above-mentioned guide strips and bushings. A short, longitudinally extending member 206 is welded along one side or the other of each of the gussets 202 for additional strength. A locking member 207 is affixed by means of a bolt 208 to each adjacent gusset 202 and extends into an end slot in one end of each pressure block 192 and functions to lock the latter against rotation about its shaft 194. Thus, to remove any particular one of the guide strips, it is necessary only to remove the corresponding pin 198. The bottom guide strips 201a and 201b are guided along their lower edges 209 by engagement with the top surfaces 211 of the angle members 167. Similarly, the top guides 201c and 201d are guided along their upper edges 212 by engagement with the under surfaces 213 of the angle members 166. Also, upper and lower pairs of said guide strips are slideable against one another along a common inner face designated 214 in Fig. 12.

As best shown in Fig. 2, the lower reach of the conveyor chain is looped about a drive sprocket 216, a roller 217 and the two idler rollers 196 to dispose it in the form of an expandable loop which may be expanded to store chain responsive to pressure directed into the block 177 through conduit 189.

With the structure just described, it will be seen that, when the reciprocable frame B is moved forward relative to the main frame to extend the conveyor chain by increasing the distance between front and rear idlers 53 and 93, the hydraulic loop 163 will be contracted, against the pressure within the cylinders, to thereby permit the proper length of chain to be drawn out. The hydraulic pressure, being effective while the chain is being drawn out, will maintain the latter at all times at a predesired tension as determined by the pressure of fluid in the block 177. Similarly, when proper pressure is applied through conduit 189 while the auxiliary frame B is being retracted, the piston rods will press the rollers 196 apart a corresponding amount to automatically store the excess chain in the pressure loop.

*Motor drives*

The conveyor driving sprocket 216 (Fig. 2) is rotatably driven by a motor 218 (Fig. 1) through a speed reducer 219 (including a worm 221 and worm wheel 222 as shown in Fig. 16), a friction clutch 223, and certain other gearing and parts shown in detail in the above-mentioned co-pending application, Serial No. 116,684.

As will now be described, the main motors 28 drive both the cutter head C and the gathering mechanism D.

The gear train through which the two motors cooperate, simultaneously, to rotatably drive the cutter chains 224 (Fig. 1) and drum 226 (Fig. 1) of the cutter head is described in detail in the above-mentioned co-pending application, Serial No. 116,684. That part of the driving arrangement, whereby each of the motors 28 drives one of the gathering chains 57, is diagrammatically shown in Fig. 8 where it will be seen that the motor shaft 227 carries a pinion 228 which drives an internally toothed ring gear 229 which in turn rotatably drives a longitudinal shaft 231 carrying a sprocket 232 about which is trained a chain 234. At a lower level (see also Fig. 20a), and driven by chain 234, is another sprocket 236 which drives a forwardly extending shaft 237 through frictional clutch means 238. A beveled pinion 239 carried by shaft 237 engages with and drives beveled gear 67, which, as previously described, drives one of the chains 57 through shaft 66. By this arrangement it will be seen that, because the pivotal axis 43 (Figs. 4, 5 and 6) of the gathering apron 42 coincides with the axes of the two transverse stub shafts 66, the apron may be pivoted up and down freely at all times. Thus, even under conditions where the shafts 66 may be locked against rotation, gears 63 would simply turn sufficiently to accommodate pivoting of the apron.

*Motor controls*

It will be apparent that if the conveyor chain 91 is slack at the time the conveyor motor 218 is started, or becomes so while running, it may disengage from the driving sprocket and cause damage. To prevent such an occurrence, another feature of the present invention includes control means for conditioning the conveyor driving motor 218 for operation only while a predetermined tension is applied to the chain by the pressure loop 163. This control means is shown diagrammatically in Fig. 19 where the conduit 189 directs output from pump 36 into the cylinder block 177. A conventional unloading valve 247 is provided for bypassing fluid through conduits 248 and 249 to a tank 251 when the output pressure attains a predetermined maximum. An electrical motor 253 is coupled to drive the pump means 36 and is connected, by lines 254 and 256, to E. M. F. sources $L_1$ and $L_2$, through a switch 252.

A normally-open, pressure-responsive switch 257 has a pressure-responsive piston element 258 communicating through conduit 259 with conduit 189, for closing of contacts 261 by conductor bar 262 responsive to pressure applied to the cylinder block 177. The pressure at which the switch is closed is dependent on the resistance of compression spring 263. In practice, the switch may be constructed to close at any one of a range of pressures.

Now considering the electrical part of the circuit, which is conditionable for energization by pressure switch 257, lines 264 and 266 are connected respectively with the E. M. F. source $L_1$ and $L_2$. A manually operable control switch 267 is connected in series with pressure switch 257 in line 266. In order to provide for concurrent operation of the cutter head C, the gathering mechanism D and the chain conveyor 91, the main driving motors 28—28 and the conveyor motor 218 are connected in parallel with one another and in series with switches 257 and 267, as shown.

As a representative set of conditions, assume it has been found by experiment that a pressure of at least 200 pounds per square inch need be applied to the cylinder block 177 to maintain the conveyor chain 91 under suitable tension under all operating conditions. The pressure-actuated switch 257 will be selected, or set, to close contacts 261—261 only at pressures above, say 210 pounds per square inch. The unloading valve means 247 will be set to unload at some higher value, say, 225 pounds per square inch.

With the above settings, assume an operator wants to start the machine. If he closes switch 267, nothing happens, because the L₁—L₂ circuit is open at switch 257 due to the fact that there is no pressure in conduit 189. On the other hand, if the operator first closes the main control switch 252, to start motor 253, to in turn cause the pump means 36 to bring conduit 189 up to the 200 pounds per square inch setting of pressure switch 257, the latter will be closed, thereby conditioning the circuit for energization of motors 28—28 and 218 whenever control switch 267 is subsequently closed.

If, during operation, the pressure in line 189 drops below the 200 pound per square inch safety point, as for instance by failure of pump means 36, the pressure switch will open, automatically stopping the conveyor motor 218 (as well as motors 28—28). This arrangement effectively guards against damage which would result if driving of the chain were attempted with insufficient tension.

*Operation*

Considering now the overall operation of the machine, refer first to the plan view of the entire machine as shown in Fig. 1. Assume, for example, that the machine is at rest after having previously defined a room or passage in a coal seam having side walls 268 and a spherical end wall 269. To start the machine at the beginning of a shift the operator first closes main control switch 252 (Fig. 19) to start the pump motor 253. This operates the previously described pump 36 as well as another pump 271 which supplies pressure for the cutter head lifting cylinders 31, the front swinging cylinder 37, the auxiliary frame reciprocating cylinders 30, the gathering apron lifting cylinders 78 and the rear boom lifting end swinging cylinders (not shown).

As soon as the pump 36 brings the pressure up in conduit 189 to a value sufficient to close pressure switch 257, main driving motors 28—28 and conveyor motor 218 can be started by the operator by closing switch 267. This will start the cutter chains 224 (Fig. 1) and the cutter drum 226 of the head C rotating in a cutting direction; at the same time, it will start the gathering chains 57 (Fig. 8) moving in their orbital paths to remove from the floor any coal dislodged by the cutter head; and likewise, the upper reach of the conveyor chain will be started moving backward to discharge coal off the rear end of the discharge boom 23 into a waiting shuttle car, conveyor belt or the like.

To start a cut, the operator turns the swinging frame section 26 to one side of the room, as shown in broken lines in Fig. 1. This is carried out by admitting pressure, through suitable controls (not shown), to the swinging cylinder 37.

By releasing pressure from the cylinders 78 (by control means not specifically shown), the operator will drop gathering apron into contact with the ground. Then he is ready to mine.

To mine, coal for instance, with this machine, the cutter head is tilted about its axis 29, upward to the roof, by directing pressure into cylinders 31. Then, with the gathering apron against the ground, the auxiliary frame B is advanced by directing pressure into reciprocating pistons 30 (Fig. 20) to sump the cutting head into the mine face 269 adjacent the roof. During sumping the gathering apron 42 will be moved with the head C and will follow any irregularity in the floor by adjustably pivoting about the axis 43. As the reciprocable frame is moved forward the effective length of the conveyor, as determined by the spacing between forward idler 53 and the rear idler 93, will be increased, while the length of the pressure loop 163 correspondingly decreases to feed out the necessary extra chain. (An important aspect of the present invention is that, because the pressure loop 163 is tensioned by fluid pressure, which is constant, the tension in the chain will remain the same at all conditions of expansion or contraction.) When the cutter head is sumped in a desired amount, say 18 inches or so, the operator will admit pressure to cylinders 31 to swing the cutter head downward, ripping coal off the face to be picked up by the gathering arms for transfer to the rear of the machine by the gathering and conveying mechanisms D and E.

The above-mentioned sumping and ripping operations will be repeated at a series of locations across the face until a new face 270 is defined following which the machine will be moved forward and the steps repeated.

While one form in which the present invention may be embodied has been shown and described it will be understood that various modifications and variations thereof may be effective without departing from the spirit and scope of the invention as defined by the appended claims.

Thus, it will be seen that the mechanism described above and covered by the following claims is primarily useful in continuous miners but possesses little or no substantial utility in loading machines.

We claim:

1. Extensible conveying apparatus for a mining machine comprising: frame means having opposed direction-changing elements; an endless flexible material-carrying member trained across said direction-changing elements for orbital movement about said frame means; the spacing of said elements being effective to determine the effective length of said flexible member; said frame means being extensible for varying the spacing between said direction-changing elements to vary the effective length of said flexible member; fluid-pressure-operated tightening means operable responsive to the application of fluid pressure thereto to maintain said flexible member contracted against said direction-changing elements; and a source of fluid under pressure connected with said tightening means to maintain a predetermined tension in said flexible member over a range of extended conditions of said frame means; drive means for driving said flexible material-carrying member in its orbit about said frame means and control means controlling the operation of said flexible member by said drive means responsive to the tension in said flexible member.

2. Extensible conveying apparatus for a mining machine comprising: frame means having opposed direction-changing elements; an endless flexible material-carrying member trained across said direction-changing elements for orbital movement about said frame means; the spacing of said elements being effective to determine the effective length of said flexible member; said frame means being extensible for varying the spacing between said direction-changing elements to vary the effective length of said flexible member; fluid-pressure-operated tightening means operable responsive to the application of fluid pressure thereto to maintain said flexible member contracted against said direction-changing elements; and a source of fluid under pressure connected with said tightening means to maintain a predetermined tension in said flexible member over a range of extended conditions of said frame means; drive means for driving said flexible member to carry material from one end of the frame means to the other; and control means operably associated with said drive means effective to control the starting and stopping of said flexible member responsive to variation in said fluid pressure applied to the tightening means.

3. Extensible conveying apparatus for a mining machine comprising: an extensible frame having an endless flexible material-carrying member trained for orbital movement thereabout; means for extending said frame; and tightening means effective to maintain a predetermined tension in said flexible member including fluid-pressure-operated means operable in response to fluid pressure applied thereto to stress said flexible member; a source of fluid pressure; means for driving said flexible member; and means for automatically controlling the operation of the driving means responsive to pressure applied to said fluid-pressure-operated means.

4. Extensible conveying apparatus for a mining machine comprising: an extensible frame having an endless flexible material-carrying conveyor member trained for orbital movement thereabout; extension means for extending and retracting said frame to vary the effective length of said conveyor member; and tightening means for maintaining a predetermined tension in said conveyor member including fluid pressure expansible means engageable with a section of said conveyor member; means for applying fluid pressure to said expansible means; means for driving said conveyor member about said frame; and means for automatically controlling the starting and stopping of the driving means responsive to the expansion of said expansion means.

5. Extensible conveying apparatus for a mining machine comprising: an extensible frame having an endless flexible material-carrying conveyor member trained for orbital movement thereabout; extension means for extending and retracting said frame to vary the effective length of said conveyor member; and tightening means for maintaining a predetermined tension in said conveyor member including fluid pressure expansible means engageable with a section of said conveyor member; means for applying fluid pressure to said expansible means; means for driving said conveyor member about said frame; and control means automatically operable to actuate said driving means responsive to a predetermined degree of expansion of said expansible means.

6. Extensible conveying apparatus for a mining machine comprising: an extensible frame having an endless flexible material-carrying conveyor member trained for orbital movement thereabout; extension means for extending and retracting said frame to vary the effective length of said conveyor member; and tightening means for maintaining a predetermined tension in said conveyor member including fluid pressure expansible means engageable with a section of said conveyor member; means for applying fluid pressure to said expansible means; motor means for driving said conveyor member about said frame; and control means for said motor means operable responsive to the degree of expansion of said expansible means for conditioning said motor means for operation responsive to expansion of the expansible means beyond a predetermined degree and for de-actuating said motor means responsive to contraction of said expansible means below its said predetermined extent.

7. Extensible conveying apparatus for a mining machine comprising: an extensible frame having an endless flexible material-carrying conveyor trained for orbital movement thereabout; means for extending and contracting said frame to vary the effective length of said conveyor; tightening means for said conveyor including means for guiding a portion of said conveyor in the form of an auxiliary loop; piston and cylinder means associated with said loop and tending to expand the latter when fluid pressure is applied to said piston and cylinder means; and a source of fluid pressure connected to said piston and cylinder means; means for extending said frame to decrease the size of said loop against the urgence of said piston and cylinder means; whereby when the effective length of the conveyor is contracted said piston and cylinder means will be effective to take up said conveyor by expansion of said loop; and whereby further substantially the same tension will be maintained in said conveyor throughout its range of extended conditions.

8. Extensible conveying apparatus for a mining machine comprising: a frame having an endless flexible conveyor member trained for movement in a primary loop having a material-carrying strand and an auxiliary loop; said frame being extensible to vary the effective length of said primary loop; said auxiliary loop being biased toward maximum size by pressure-expansible means for tensioning said conveyor member; a source of fluid under pressure connected with said pressure-expansible means; and pressure-controlling means between said source and expansible means to control the pressure of fluid in the latter to a predetermined value for maintaining a predetermined tension in the conveyor member primary loop over a range of extended positions.

9. Extensible conveying apparatus for a mining machine comprising: a frame having an endless flexible conveyor member trained for orbital movement thereabout through a material conveying reach and a return reach; said frame being expandable to vary the effective length of said conveying reach; said return reach having a portion thereof formed in the shape of a loop; pressure-expandable means being effective when subjected to fluid pressure to expand said loop for tensioning said conveyor member; a source of fluid under pressure connected with said pressure expansible means; drive means for driving said conveyor member orbitally about said frame and control means operably associated with said drive means and the pressure expansible means effective to condition the drive means for operation responsive to a predetermined degree of expansion of said expansible means.

References Cited in the file of this patent

UNITED STATES PATENTS

| Number | Name | Date |
|---|---|---|
| 2,390,410 | Andershock | Dec. 4, 1945 |
| 2,436,657 | McCulloch | Feb. 24, 1948 |
| 2,452,980 | Beltz | Nov. 2, 1948 |
| 2,507,341 | Lee | May 9, 1950 |
| 2,527,452 | Rose | Oct. 24, 1950 |
| 2,527,943 | Lee | Oct. 31, 1950 |
| 2,589,827 | Lee | Mar. 18, 1952 |